United States Patent

Ohkubo et al.

[11] Patent Number: 5,424,972
[45] Date of Patent: Jun. 13, 1995

[54] CARRY LOOK AHEAD CIRCUIT

[75] Inventors: Norio Ohkubo, Tokyo; Makoto Suzuki, Niiza, both of Japan; Katsuro Sasaki, Buringame, Calif.

[73] Assignee: Hitachi, Ltd., Tokyo, Japan

[21] Appl. No.: 115,737

[22] Filed: Sep. 3, 1993

[30] Foreign Application Priority Data

Sep. 4, 1992 [JP] Japan .................. 4-236859

[51] Int. Cl.[6] .................................. G06F 7/50
[52] U.S. Cl. .................................. 364/788
[58] Field of Search ................ 364/786, 787, 788, 760

[56] References Cited

U.S. PATENT DOCUMENTS

| | | | |
|---|---|---|---|
| 4,439,835 | 3/1984 | Best et al. ............... | 364/786 |
| 4,831,578 | 5/1989 | Bui ........................ | 364/784 |
| 5,027,311 | 6/1991 | Zion ...................... | 364/788 |
| 5,027,312 | 6/1991 | Knauer ................... | 364/788 |
| 5,040,139 | 8/1991 | Tran ...................... | 364/760 |
| 5,272,662 | 12/1993 | Scriber et al. ............ | 364/788 |

OTHER PUBLICATIONS

Baifukan "Design of CMOS VLSI", 1989, pp. 217-220.

*Primary Examiner*—David H. Malzahn
*Attorney, Agent, or Firm*—Antonelli, Terry, Stout & Kraus

[57] ABSTRACT

A carry look ahead circuit includes a first circuit for generating a logical sum of inputs, a second circuit for generating a logical product of the inputs, and a selection circuit for selecting either one of an output of the first circuit and an output of the second circuit in accordance with a carry signal from a lower figure to produce the selected output as a carry signal. Consequently, the number of circuit elements can be reduced greatly to configure the high speed and low power consumption carry look ahead circuit.

3 Claims, 13 Drawing Sheets

CARRY LOOK AHEAD CIRCUIT

BACKGROUND OF THE INVENTION

Field of the Invention

The present invention relates to a high speed and low power consumption logic circuit which is generally suitable for logic circuits of a data processor.

DESCRIPTION OF THE RELATED ART

A prior art circuit relative to the present invention is described, for example, in Japanese literature "DESIGN OF CMOS VLSI", Baifukan, 1989, pp. 217-220.

In the logic circuits used in the data processor, an adder is one of the most basic constituent elements and is predominant in the determination of the operation speed of the data processor in most cases. Accordingly, it is desired to attain the high-speed operation of the adder.

On the other hand, the performance of a multi-bit adder greatly depends on high-speed propagation performance of a carry signal. Heretofore, as a method of increasing a carry propagation speed of the multi-bit adder, a carry look ahead (CLA) circuit has been well known. FIG. 2 is a logical diagram of a four-bit carry look ahead circuit described in "DESIGN OF CMOS VLSI", Baifukan, 1989, p. 219. In FIG. 2, $X_i$ and $Y_i$ (i=0, 1, 2, 3) are an addend and an augend for the i-th bit, respectively, and $C_i$ (i=0, 1, 2, 3) is a carry signal for the i-th bit.

The carry signal $C_i$ can be expressed as follows:

$$C_i = G_i + P_i \cdot C_{i-1}$$

where $G_i$ is a carry signal generated by an input value of the own figure and is an AND of $X_i$ and $Y_i$. $P_i \cdot C_{i-1}$ is a carry signal generated by a carry signal $C_{i-1}$ from a lower figure and $P_i$ is an exclusive OR of $X_i$ and $Y_i$.

Accordingly, the carry look ahead circuit of FIG. 2 generates the following carry signals.

$$C_0 = G_0 + P_0 \cdot C_{-1}$$

$$C_1 = G_i + G_0 P_1 + P_0 \cdot P_1 \cdot C_{-1}$$

$$C_2 G_2 + G_1 \cdot P_2 + G_0 \cdot P_1 \cdot P_2 + P_0 \cdot P_1 \cdot P_2 C_{-1}$$

$$C_3 = G_3 + G_2 \cdot P_3 + G_1 \cdot P_2 \cdot P_3 + G_0 \cdot P_1 \cdot P_2 \cdot P_3 + P_0 \cdot P_1 \cdot P_2 \cdot P_3 \cdot C_{-1}$$

The conventional circuit illustrated in FIG. 2 has a problem that sufficient high-speed operation is not obtained since the fan-in number and the fan-out number of the logic gates are large. Particularly, in the circuit of FIG. 2, the fan-out number of logic gates 202 and 203 are 6 and the fan-in number of logic gates 217 and 224 is 5.

In this manner, since the logic gates having a large fan-out number and a large fan-in number are used, a delay time of the conventional carry look ahead circuit is 10 times as long as that of an inverter circuit or more.

SUMMARY OF THE INVENTION

Accordingly, it is an object of the present invention to provide a logic circuit using logic gates having a small fan-out number and a small fan-in number to attain high-speed operation.

In order to achieve the object, each figure of the carry look ahead circuit according to an aspect of the present invention comprises:
- a first circuit (101-104) for generating a logical sum of inputs to its own figure;
- a second circuit (105-108) for generating a logical product of the inputs to the own figure; and
- a selection circuit (111-114) for selecting any one of an output of the first circuit (101-104) and an output of the second circuit (105-108) in accordance with a carry signal ($C_{-1}$, $C_0$, $C_1$, $C_2$) from a lower figure to generate the selected output as a carry signal (see FIG. 1).

Thus, in the carry look ahead circuit according to the aspect of the present invention, since any one of two input signals is selected in accordance with the carry signal from the lower figure to generate the carry signal, the fan-out number and the fan-in number of the logic gates can be reduced greatly as compared with the conventional logic circuit and the number of elements for configuring the circuit can be also reduced greatly.

DESCRIPTION OF THE PREFERRED EMBODIMENTS

An embodiment of the present invention will now be described in detail with reference to the accompanying drawings.

Figure 1:
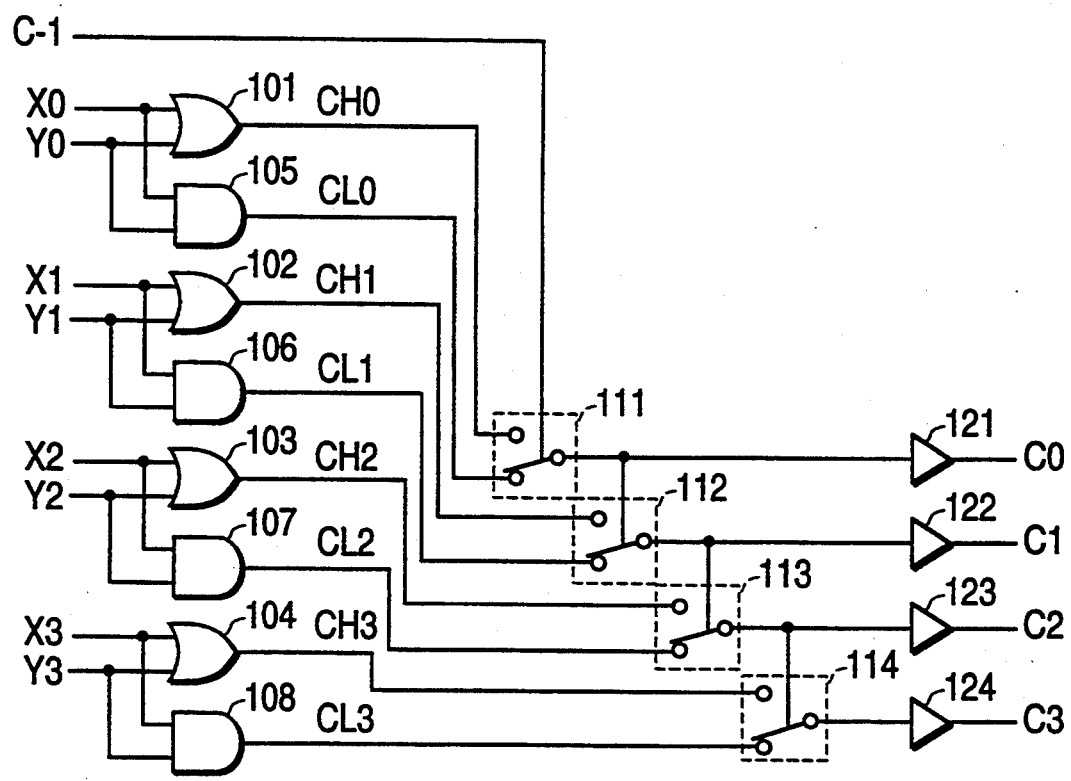
FIG. 1 is a logical diagram of a four-bit carry look ahead circuit according to an embodiment of the present invention.

FIG. 1 is a logic circuit of a four-bit carry look ahead circuit according to an embodiment of the present invention. In FIG. 1, numerals 101 to 104 denote a two-input OR circuit, 105 to 108 a two-input AND circuit, and 111 to 114 a two-input selection circuit.

FIG. 1 illustrates a circuit state selected when all of selection signals $C_{-1}$ to $C_2$ for controlling the two-input selection circuits 111 to 114 are false ("0"). Numerals 121 to 124 denote an output buffers. The output buffers 121 to 125 are not required when loads for carry output signals $C_0$, $C_1$, $C_2$ and $C_3$ are light. Further, $X_0$ to $X_3$ and $Y_0$ to $Y_3$ represent input signals for each figure, and $C_0$ to $C_3$ represent carry signals for each figure, $C_{-1}$ representing a carry signal from a lower figure.

On the other hand, in the case where the carry signal from the lower figure is false, a carry signal is generated when both of X and Y are "1". That is, the carry signal can be obtained by a logical product of X and Y.

Further, in the case where the carry signal from the lower figure is true ("1"), a carry signal is generated when one or both of X and Y are "1". That is, the carry signal can be obtained by a logical sum of X and Y.

The two signals are selected in accordance with the carry signal from the lower figure to thereby generate a carry signal for that figure. This is expressed as follows:

$$C_i = G_i + P_i * C_{i-1}$$
$$\text{if } C_{i-1} = 0: C_i = G_i = X_i * Y_i$$
$$\text{if } C_{i-1} = 1: C_i = G_i + P_i = X_i + Y_i$$

Repetition of this operation generates carry signals for each figure of a plurality of bits.

More particularly, the carry look ahead circuit of FIG. 1 performs the following operation. That is, when the carry signal $C_{-1}$ from the lower figure is true, the two-input selection circuit 111 selects an output CH0 of the two-input OR circuit 101 and accordingly the carry signal $C_O$ of $X_O+Y_O$ is obtained, while when the carry signal $C_{-1}$ from the lower figure is false, the two-input selection circuit 111 selects an output CL0 of the two-input AND circuit 105 and accordingly the carry signal $C_O$ of $X_O \cdot Y_O$ is obtained. Further, when the carry signal $C_O$ is true, the two-input selection circuit 112 selects an output CH1 of the two-input OR circuit 102 and accordingly the carry signal $C_1$ of $X_1+Y_1$ is obtained, while when the carry signal $C_O$ is false, the two-input selection circuit 112 selects an output CL1 of the two-input AND circuit 106 and accordingly the carry signal $C_1$ of $X_1 \cdot Y_1$ is obtained. Other two-input selection circuits 113 and 114 can be also controlled to switch the input signals thereof in accordance with the carry signals $C_1$ and $C_2$, respectively, in the same manner as described above to produce carry signals $C_2$ and $C_3$, respectively.

In the circuit configuration of FIG. 1, the fan-out number of each of the OR circuits 101 to 104 and the AND circuits 105 to 108 is 1 and the fan-out number of each of the selection circuits 111 to 114 constituting a two-input one-selection circuit is 2, so that the high-speed operation can be attained.

Figure 2:
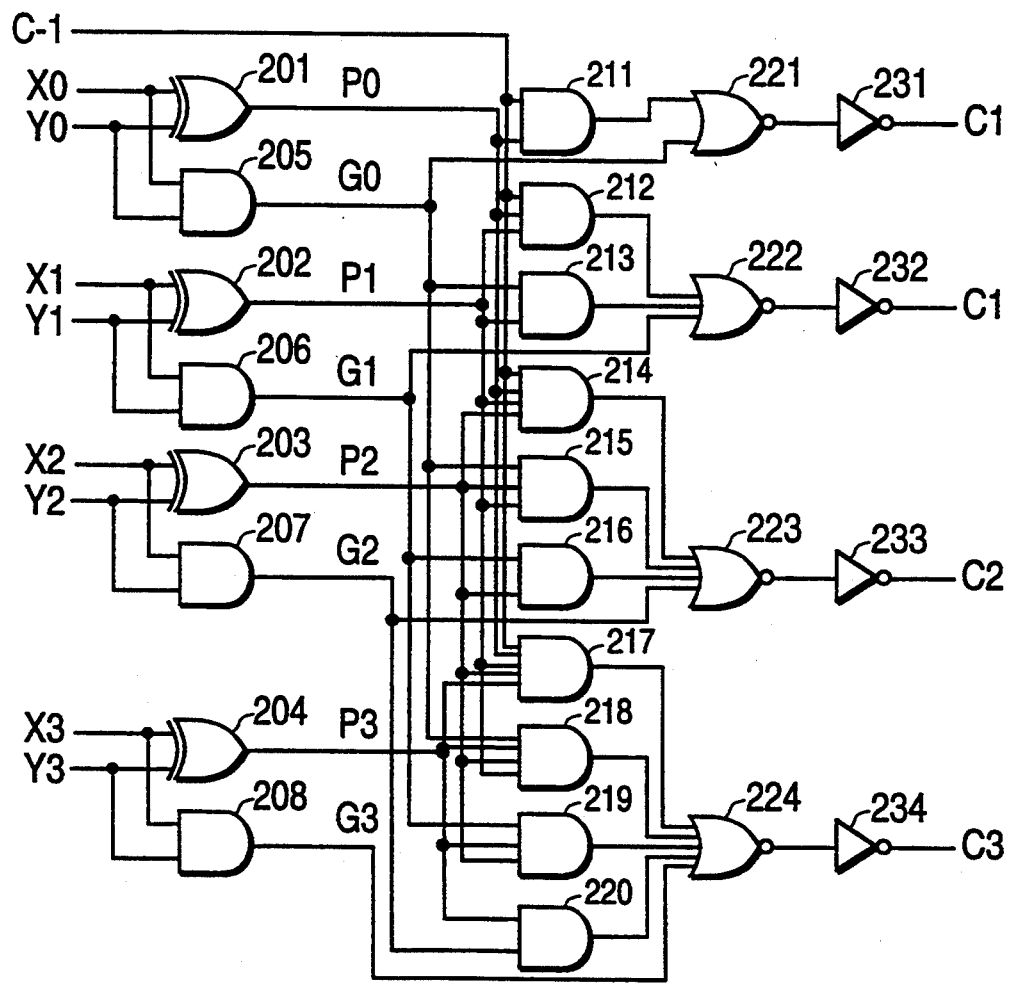
FIG. 2 is a logical diagram of a conventional four-bit carry look ahead circuit.
Figure 4:
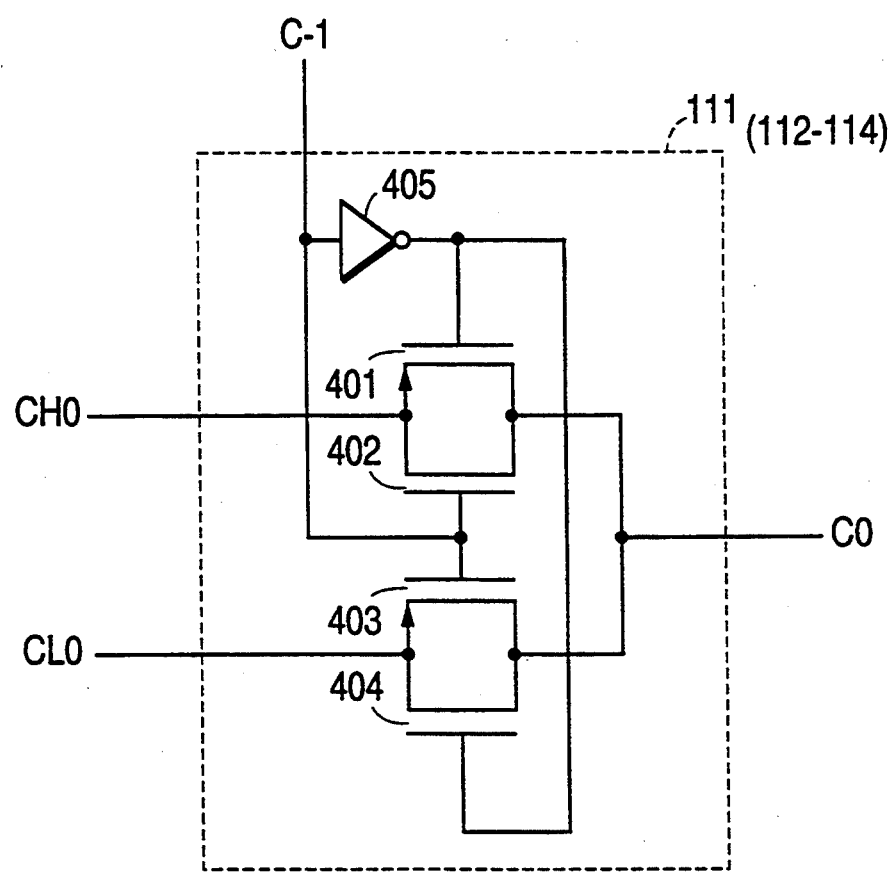
FIG. 4 is a schematic diagram illustrating an embodiment of a selection circuit constituting a logic circuit of an embodiment of the present invention.

Referring now to FIG. 4, an embodiment of the two-input selection circuits 111 to 114 using MOS transistors is illustrated. In FIG. 4, numerals 401 and 403 denote a p-MOS transistor, 402 and 404 an n-MOS transistor, and 405 an inverter circuit. When the carry signal $C_{-1}$ is true, the input signal CH0 is selected and when the carry signal $C_{-1}$ is false, the input signal $C_O$ is selected to be produced as the output signal $C_O$. When the selection circuits of FIG. 4 and CMOS logic circuits are used to constitute the carry look ahead circuit shown in FIG. 1, the number of MOS transistors is 64. On the other hand, when the conventional carry look ahead circuit shown in FIG. 2 is constituted by CMOS logic circuits, at least 144 MOS transistors are required. Accordingly, the number of elements for configuring the logic circuit according to the can be reduced to a half as compared with the conventional circuit.

Figure 5:
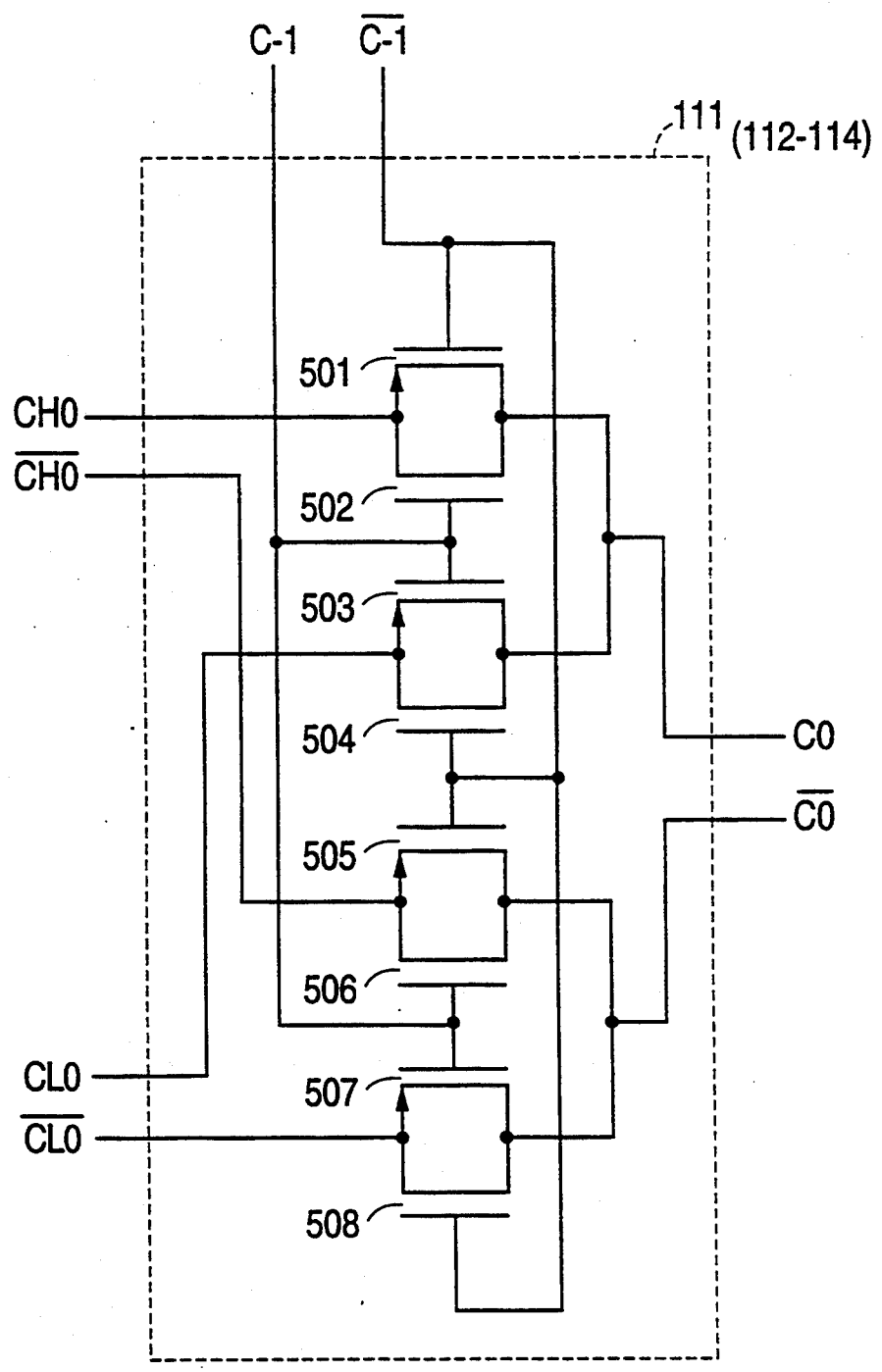
FIG. 5 is a schematic diagram illustrating another embodiment of a selection circuit constituting a logic circuit of an embodiment of the present invention.

FIG. 5 schematically illustrates another embodiment of the selection circuit. In FIG. 5, numerals 501, 503, 505 and 507 denote a p-MOS transistor, and 502, 504, 506 and 508 an n-MOS transistor. Since each of input and output signals of the selection circuit is constituted by two signal lines having a relationship of logical inversion and the inverter circuit of the selection circuit shown in FIG. 4 is not required, the selection circuit of FIG. 5 can attain the high-speed operation. Since the selection circuit of FIG. 5 can perform the selection operation in the delay time corresponding to that of about one stage of the inverter circuit, the delay time of the carry look ahead circuit shown in FIG. 1 is equal to a delay time of several stages of the inverter circuits, so that the carry look ahead circuit of FIG. 1 can operate with the delay time equal to a half of that of the conventional logic circuit shown in FIG. 2.

When any of the selection circuits of FIGS. 4 and 5 is used to configure the logic circuit of FIG. 1, one feature of the embodiment is that two or more MOS transistors of the selection circuit are not connected in series. An output of the selection circuit becomes a selection input signal for the succeeding stage and is connected to a gate of the MOS transistor of the selection circuit in the succeeding stage. Accordingly, there is no reduction of current due to a reduced voltage between a source and a drain caused by a series connection of MOS transistors and the high-speed operation can be attained.

Figure 13:
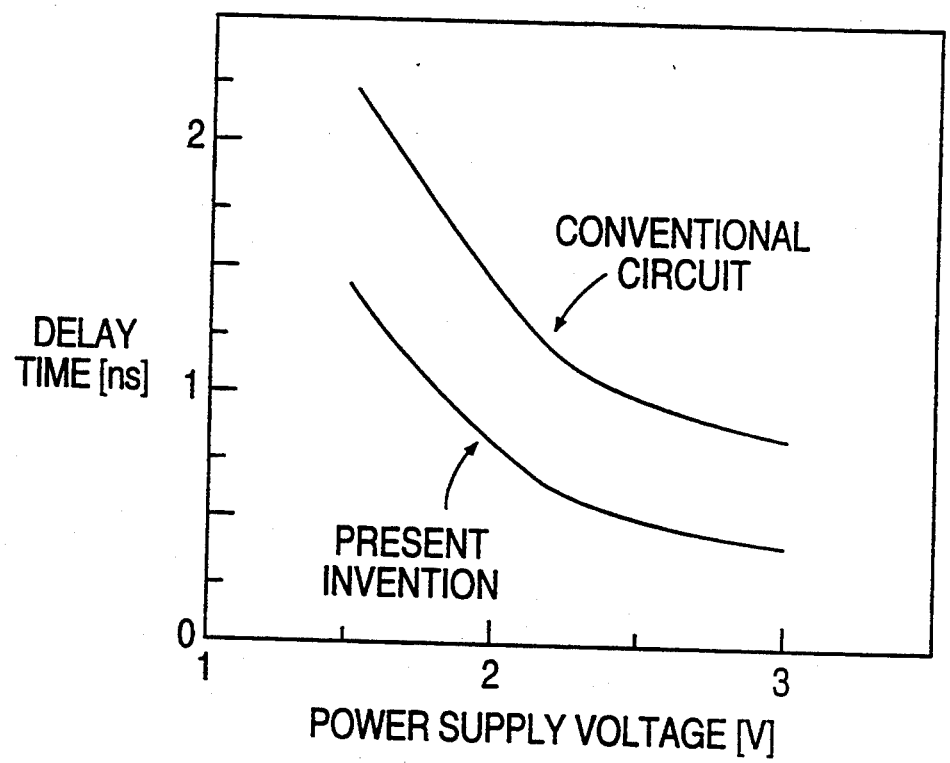
FIG. 13 is a graph showing a comparison of a delay time between a logic circuit according to the present invention and a conventional logic circuit.

FIG. 13 shows dependency on a supply voltage of the delay time of the circuit according to the present invention and the conventional circuit shown in FIG. 2 as evaluation results by a circuit simulation. The logic circuit according to the present invention can operate at a higher speed than the conventional logic circuit even if the supply voltage is reduced due to the miniaturization of elements.

Figure 11:
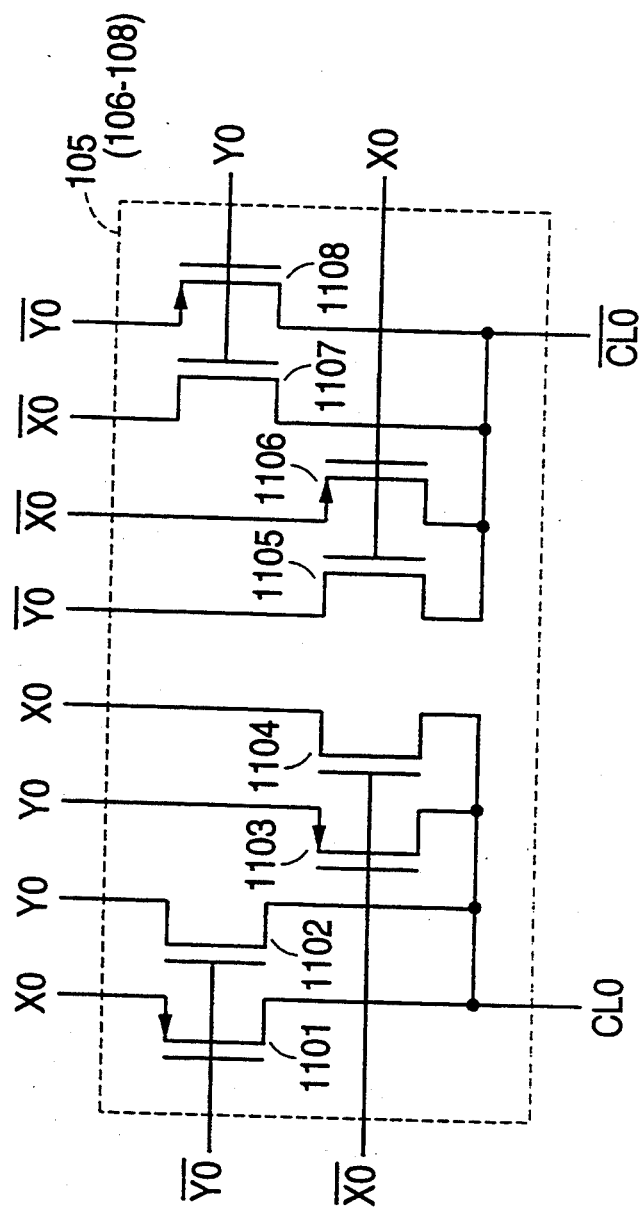
FIG. 11 is a schematic diagram illustrating an embodiment of a carry generation circuit constituting a logic circuit according to the present invention.

FIG. 11 is a circuit diagram of an embodiment of the carry generation circuits 105 to 108. In FIG. 11, inverted signals are given bars. Replacement of affirmation and inversion in input and output signals in the circuit of FIG. 11 can constitute a circuit for the carry generation circuits 101 to 104. Further, the circuit of FIG. 11 does not require a supply voltage and accordingly can constitute a logic circuit having a low power consumption.

Figure 12:
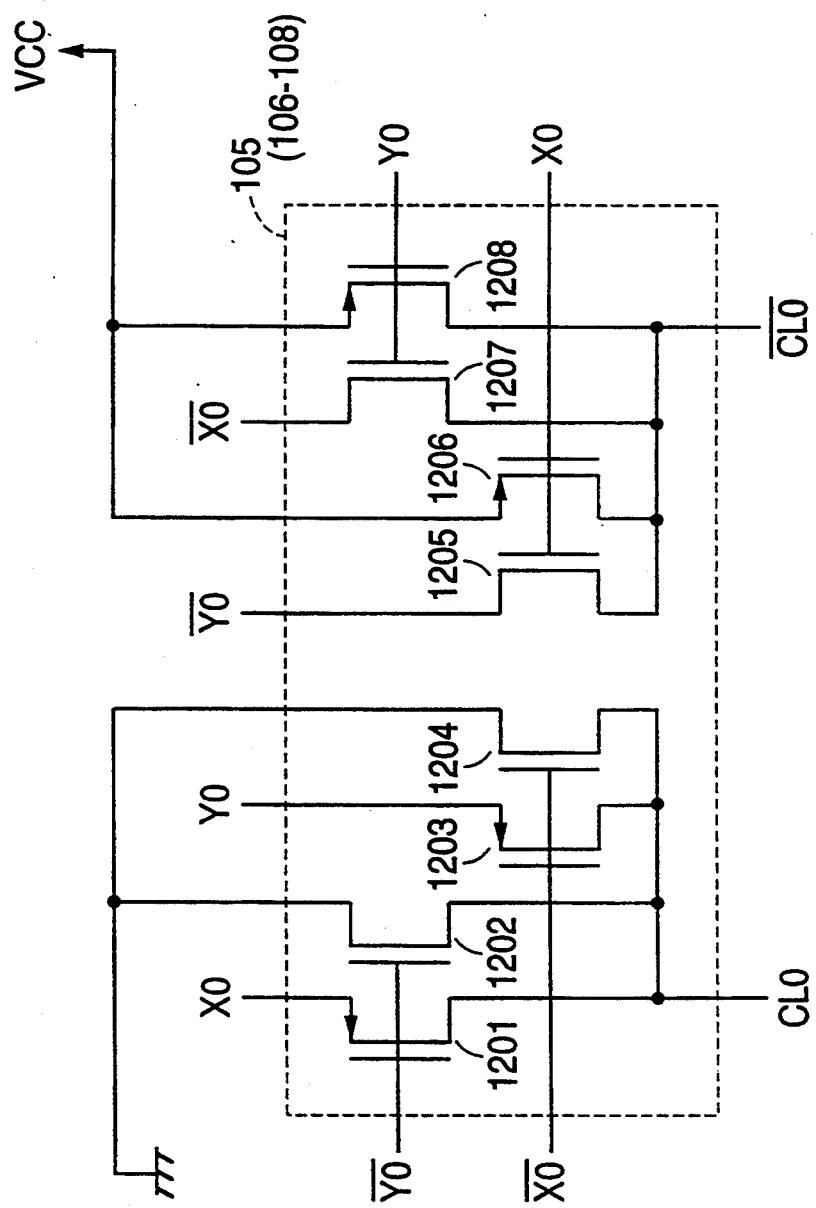
FIG. 12 is a schematic diagram illustrating another embodiment of a carry generation circuit constituting a logic circuit according to the present invention.

FIG. 12 is a circuit diagram of another embodiment of the carry generation circuits 105 to 108. The circuit of FIG. 12 can constitute a logic circuit which operates at a high speed by supplying a supply voltage.

Figure 3:
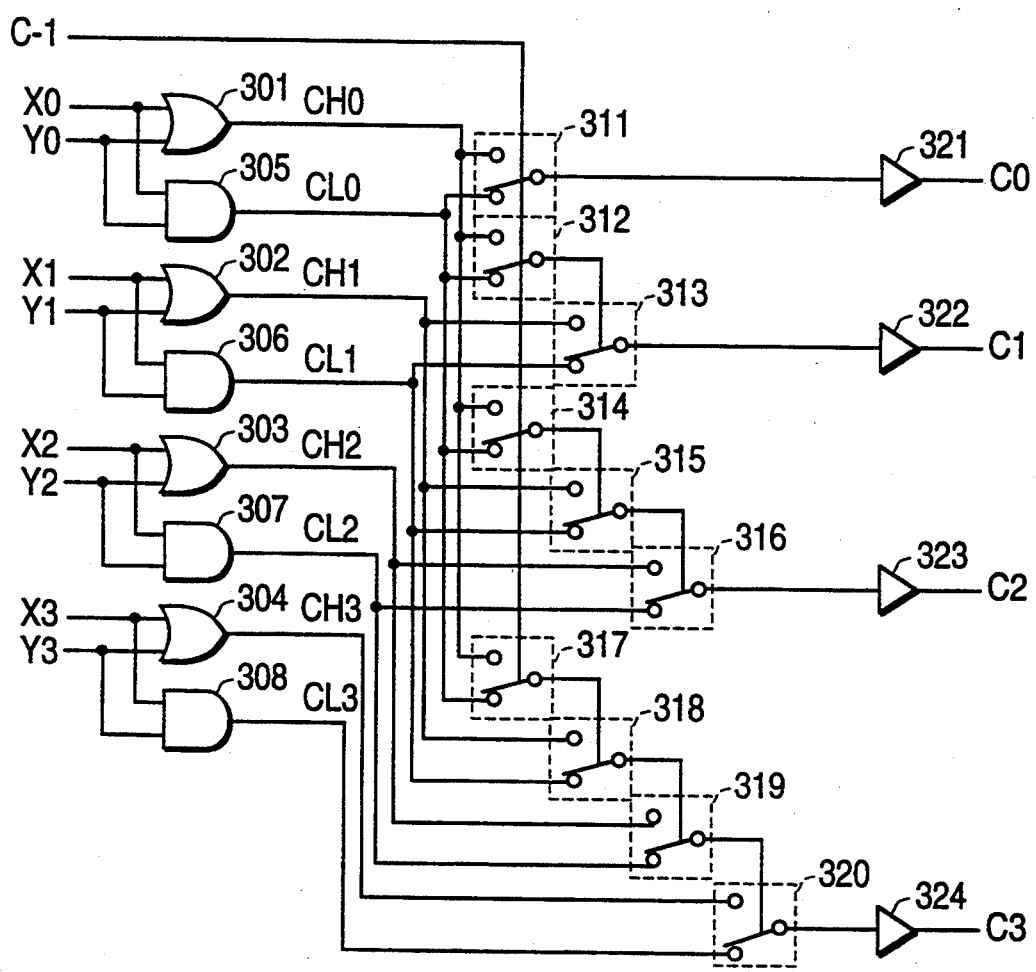
FIG. 3 is a logical diagram of a four-bit carry look ahead circuit according to another embodiment of the present invention.

FIG. 3 schematically illustrates another embodiment of a four-bit carry look ahead circuit according to the present invention. When an output load of a carry signal is heavy, the selection circuits are multi-connected for each bit as shown in this embodiment so that a delay due to the output load is not accumulated to thereby attain the high-speed operation. It will be readily understood that the circuit of FIG. 3 generates the same carry signals $C_O$, $C_1$, $C_2$ and $C_3$ as those of the circuit of FIG. 1.

In the above embodiments, the four-bit carry look ahead circuit has been described and illustrated, while it is apparent that the logic circuit according to the present invention can be expanded to any bits.

Figure 6:
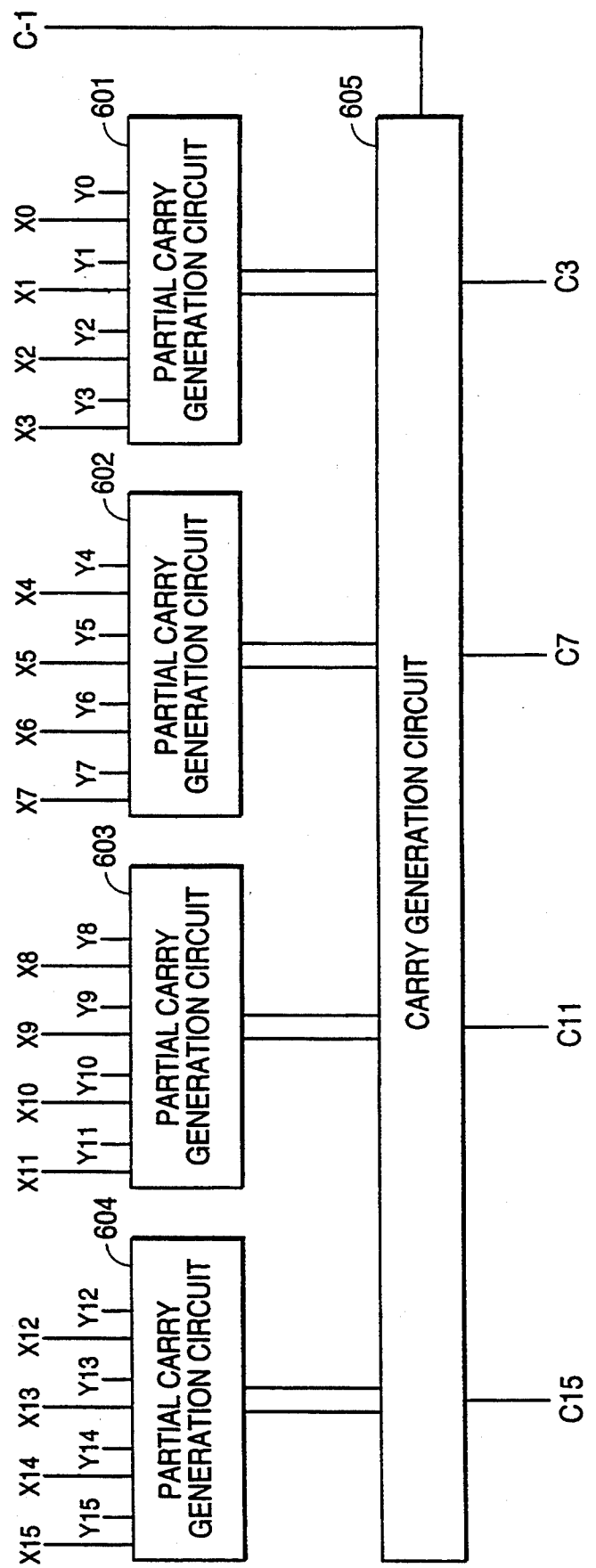
FIG. 6 is a block diagram of a 16-bit carry look ahead circuit according to a further embodiment of the present invention.

FIG. 6 schematically illustrates a further preferred embodiment of a 16-bit carry look ahead circuit. In FIG. 6, numerals 601 to 604 denote a four-bit partial carry generation circuit and 605 a carry generation circuit for every four bits.

Figure 7:
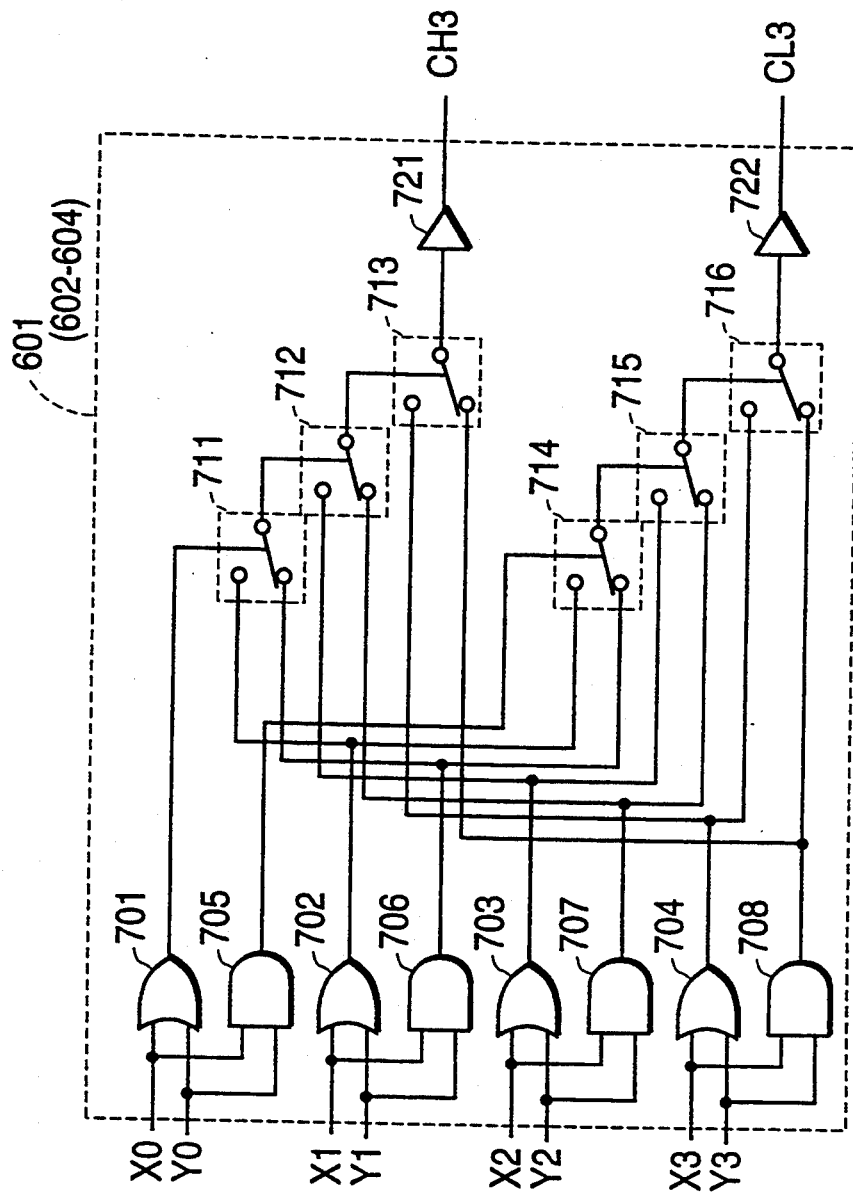
FIG. 7 is a logical diagram of a first-stage carry generation circuit of the 16-bit carry look ahead circuit according to an embodiment of the present invention.
Figure 8:
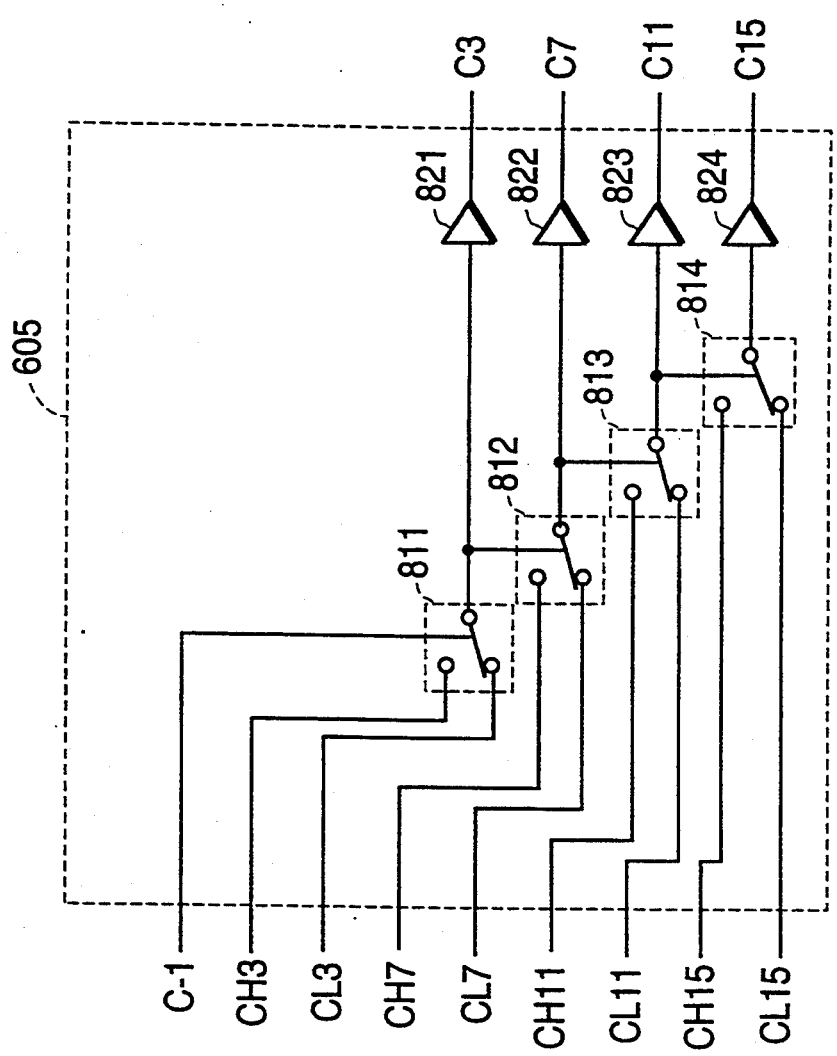
FIG. 8 is a logical diagram of a second-stage carry generation circuit of the 16-bit carry look ahead circuit according to an embodiment of the present invention.

FIG. 7 is a logical diagram of the partial carry generation circuits 601 to 604 of FIG. 6 and FIG. 8 is a logical diagram of the carry generation circuit 604 of FIG. 6. Since the carry look ahead circuits are used dually, the carry signal for every four bits is generated at a high speed. That is, the partial carry generation circuit shown in FIG. 7 generates two carry signals for the case where the carry signal from the preceding block is true and for the case where it is false, respectively, and one of the two carry signals is selected by the carry generation circuit shown in FIG. 8 so that the carry signal for every four bits is generated. Accordingly, the carry signal for the 16-th bit is generated by the selection circuit of the seventh stage, so that the delay time is shortened to a half or less.

An example of the operation of the circuit shown in FIG. 7 (in cooperation with associated fig. drawings) will now be further explained. First, a logical output of an output node CH3 will be obtained. The output of a selection circuit 711 will be assumed as, $(X0+Y0)\cdot(X1+Y1)+\overline{(X0+Y0)}\cdot X1\cdot Y1(=A)$. The output of a selection circuit 712 will be assumed as $A\cdot(X2+Y2)+\overline{A}\cdot X2\cdot Y2(=B)$. The output of a selection circuit 713 will be assumed as $B\cdot(X3+Y3)+\overline{B}\cdot X3\cdot Y3(=CH3)$. As will be apparent from these logical operations, when the operation result of the addend X0 to X3 and the augend Y0 to Y3 is (1111) or (1----), a logical output of the output node CH3 will be "1".

Next, a logical output of an output node CL3 will be obtained. The output of a selection circuit 714 will be assumed as $X0\cdot Y0\cdot(X1+Y1)+\overline{X0\cdot Y0}\cdot X1\cdot Y1$ $(=A')$. The output of a selection circuit 712 will be assumed as $A'\cdot(X2+Y2)+\overline{A'}\cdot X2\cdot Y2(=B')$. The output of a selection circuit 713 will be assumed as $B'\cdot(X3+Y3)+\overline{B'}\cdot X3\cdot Y3(=CL3)$. As will be seen from these logical operations, when an operation result of the addend X0 to X3 and the augend Y0 to Y3 is (1----), a logical output of the output node CL3 will be "1".

Thus, it can be seen that when the carry signal (C-1) of the preceding stage is "1", the carry signal will be "1" for the operation result of the addend X0 to X3 and the augend Y0 to Y3 being (1111) or (1'---), and when the carry signal (C-1) of the preceding stage is "0", the carry signal will be "1" for the operation result of the addend X0 to X3 and the augend Y0 to Y3 being (1 ----).

As will be seen from the above operation, it can be said that the output node CH3 outputs a carry signal candidate when it is assumed beforehand that the preceding stage carry signal (C-1) is "1", and that the output node CL3 outputs a carry signal candidate when it is assumed beforehand that the preceding stage carry signal (C-1) is "0".

In FIG. 8, a selection circuit 811 selects a signal from CH3 when the preceding stage carry signal (C-1) is "1", and it selects a signal from CL3 when the preceding stage carry signal (C-1) is "0". This selection operation is performed only once in the addition of the plurality of figures (X0 to X3, Y0 to Y3). Accordingly, it is possible to output the carry signal fast in the addition of the plurality of figures.

Figure 9:
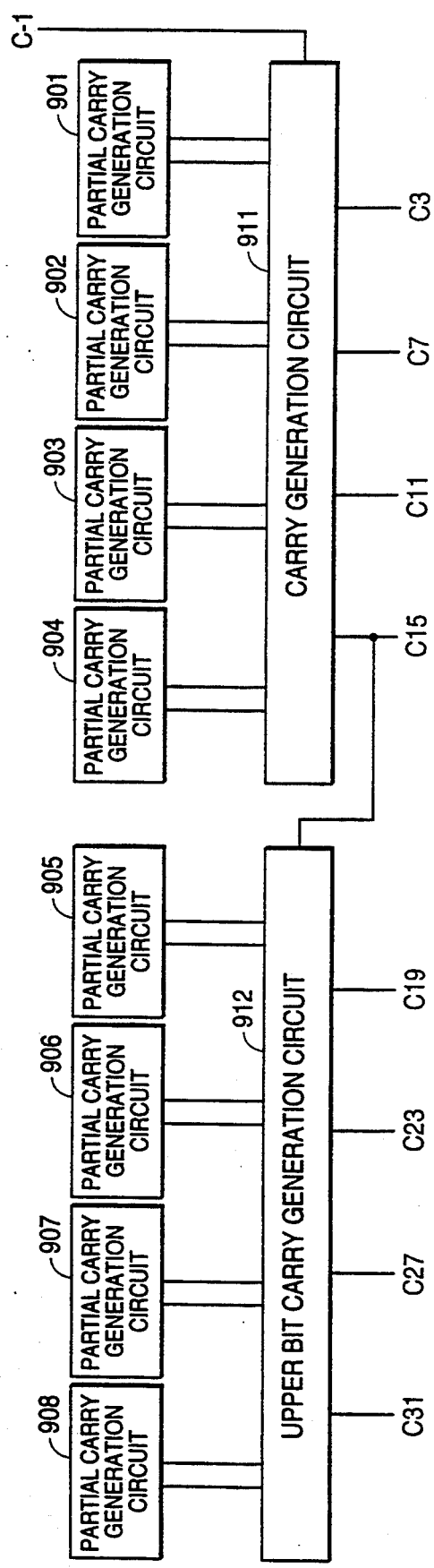
FIG. 9 is a block diagram of a 32-bit carry look ahead circuit according to still another embodiment of the present invention.
Figure 10:
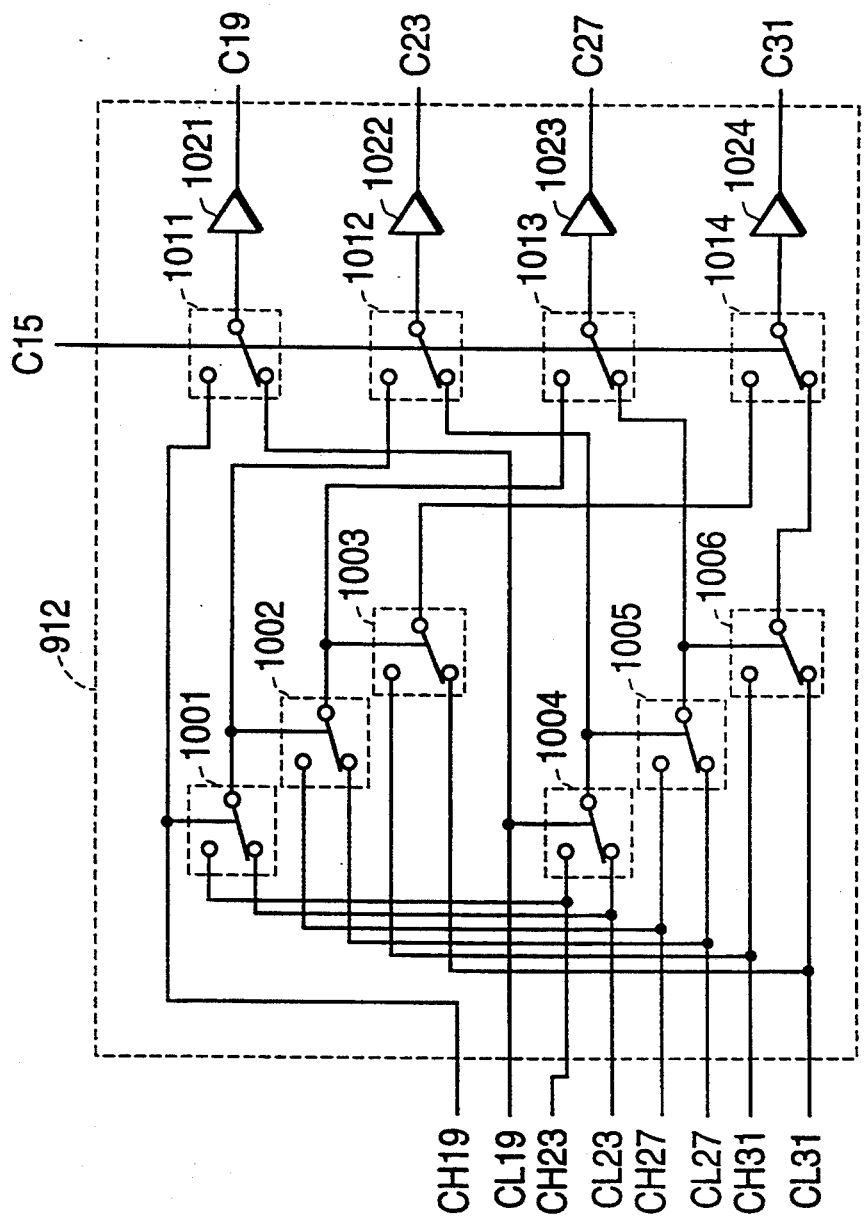
FIG. 10 is a logical diagram of a second-stage upper bit carry generation circuit of the 32-bit carry look ahead circuit according to an embodiment of the present invention.

FIG. 9 schematically illustrates a further preferred embodiment of a 32-bit carry look ahead circuit. In FIG. 9, numerals 901 to 908 denote a four-bit partial carry generation circuit, and 911 and 912 a carry generation circuit for every four bits. The partial carry generation circuits 901 to 908 and the carry generation circuit 911 are the same as the partial carry generation circuits 601 to 604 and the carry generation circuit 605 of the 16-bit carry look ahead circuit shown in FIG. 6, respectively. The 32-bit carry look ahead circuit is featured by the upper bit carry generation circuit 912 and a logical diagram thereof is schematically illustrated in FIG. 10. The upper bit carry generation circuit of the second stage for upper 16 bits generates two carry signals for the case where the carry signal from the lower 16 bits is true and for the case where it is false, respectively, and one of the two carry signal is selected by the carry signal from the lower 16 bits, so that the carry signal for every four bits is generated. Accordingly, the carry signal for the 32-nd bit is generated by the selection circuit of the 8-th stage to thereby shorten the delay time.

In accordance with the present invention, the fan-out number and the fan-in number of the logic gate constituting the logic can be reduced greatly as compared with the conventional logic circuit. Further, the number of elements constituting the circuit can be reduced greatly and accordingly the logic circuit having the high-speed operation and the low power consumption can be realized.

What is claimed is:

1. A carry look ahead circuit comprising:
   a plurality of first input nodes for receiving a plurality of bits of an addend;
   a plurality of second input nodes for receiving a plurality of bits of an augend;
   a third input node for receiving a first signal;
   a first circuit having a first node for outputting a first carry signal candidate by a logical operation of said plurality of bits of said addend and said plurality of bits of said augend, when it is assumed that said first signal is in a first state, and a second node for outputting a second carry signal candidate by a logical operation of said plurality of bits of said addend and said plurality of bits of said augend when it is assumed that said first signal is in a second state,
   wherein said first circuit comprises:
   a plurality of logical sum producing circuits to which said plurality of bits of said addend and said plurality of bits of said augend are inputted,
   a plurality of logical product producing circuits to which said plurality of bits of said addend and said plurality of bits of said augend are inputted,
   a first selection circuit for selecting one of (i) a logical sum signal of a second bit from among said plurality of bits of said addend and a second bit from among said plurality of bits of said augend, and (ii) a logical product signal of said second bit from among said plurality of bits of said addend and said second bit from among said plurality of bits of said augend, in accordance with a logical sum signal of a first bit from among said plurality of bits of said addend and a first bit from among said plurality of bits of said augend, a second selection circuit for selecting one of (i) a logical sum signal of a third bit from among said plurality of bits of said addend and a third bit from among said plurality of bits of said augend, and (ii) a logical product signal of said third bit from among said plurality of bits of said addend and said third bit from among said plurality of bits of said augend, in accordance with an output signal of said first selection circuit, a third selection circuit for selecting one of (i) a logical sum signal of said second bit from among said plurality of bits of said addend and said second bit from among said plurality of bits of said augend, and (ii) a logical product signal of said second bit from among said plurality of bits of said addend and said second bit from among said plurality of bits of said augend, in accordance with a logical product signal of said first bit from among said plurality of bits of said addend and said first bit from among said plurality of bits of said augend, and a fourth selection circuit for selecting one of (i) a logical sum signal of said third bit from among said plurality of bits of said addend and said third bit from among said plurality of bits of said augend, and (ii) a logical product signal of said third bit from among said plurality of bits of said addend and said third bit from among said plurality of bits of said augend, in accordance with an output of said third selection circuit; and a second circuit having an output selection circuit for selecting and outputting one of a signal appearing on said first node and a signal appearing on said second node in accordance with said first signal.

2. A carry look ahead circuit according to claim 1, wherein each of said first to fourth selection circuits are at least partially constructed of field effect transistors.

3. A carry look ahead circuit according to claim 1, wherein said output selection circuit is at least partially constructed of field effect transistors.

* * * * *